United States Patent
Holtz et al.

(10) Patent No.: US 9,898,832 B1
(45) Date of Patent: Feb. 20, 2018

(54) SURFACE METALLOGRAPHIC METHOD FOR CHARACTERIZING THE DEGREE OF SENSITIZATION OF ALUMINUM-MAGNESIUM ALLOYS

(71) Applicant: The United States of America, as represented by the Secretary of the Navy, Washington, DC (US)

(72) Inventors: Ronald L. Holtz, Lorton, VA (US); Derek Horton, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 4 days.

(21) Appl. No.: 15/224,692

(22) Filed: Aug. 1, 2016

Related U.S. Application Data

(60) Provisional application No. 62/202,190, filed on Aug. 7, 2015.

(51) Int. Cl.
*G06T 7/00* (2017.01)
*G06T 7/40* (2017.01)
*C23F 1/02* (2006.01)

(52) U.S. Cl.
CPC ............ *G06T 7/408* (2013.01); *G06T 7/0008* (2013.01); *G06T 7/0083* (2013.01); *G06T 7/401* (2013.01); *C23F 1/02* (2013.01); *G06T 2207/10024* (2013.01); *G06T 2207/10056* (2013.01); *G06T 2207/20112* (2013.01); *G06T 2207/30136* (2013.01)

(58) Field of Classification Search
None
See application file for complete search history.

(56) References Cited

U.S. PATENT DOCUMENTS 5,262,839 A * 11/1993 Hayashi ................. G01N 33/20
356/237.1
9,315,886 B1   4/2016 Sethian et al.

OTHER PUBLICATIONS

Li, Fang, et al. "Measurements of degree of sensitization (DoS) in aluminum alloys using EMAT ultrasound." Ultrasonics 51.5 (2011): 561-570.*

ASTM G67-13, "Standard Test Method for Determining the Susceptibility to Intergranular Corrosion of 5XXX Series Aluminum Alloys by Mass Loss After Exposure to Nitric Acid (NAMLT Test)," (2013).

(Continued)

*Primary Examiner* — Vu Le
*Assistant Examiner* — Tracy Mangialaschi
(74) *Attorney, Agent, or Firm* — US Naval Research Laboratory; Joslyn Barritt

(57) ABSTRACT

A non-destructive method for assessing the "degree of sensitization" of ship structures formed from aluminum-magnesium marine service alloys. Features of the method include (1) selective etching of beta phase in a sensitized aluminum-magnesium alloy (2) metallographic recording of the etched surface; (3) image enhancement to produce high-contrast binary images of etched and unetched areas; (4) image analysis of the enhanced images using line segments along grain boundaries to provide statistical information about the grain boundary beta phase percentage and (5) calibration, whereby the grain boundary beta phase percentage is converted to an expression of the degree of sensitization in the sample.

10 Claims, 4 Drawing Sheets

(56) References Cited

OTHER PUBLICATIONS

C. Chukunonye, "Sensitization Characterization of 5083 and 5456 Aluminum Alloys using Ultrasound," Dissertation, University of Louisiana at Lafayette (2015).
M. Shedd, G. Bunget, F. Friedersdorf, and N. Brown, "Embedded Long Service Life Monitoring System for Aluminum Alloy Sensitization," ASNE MegaRust Conference, (2013).
B.A. Shaw, "Fieldable Probe for Quantitative Assessment of Degree of Sensitization in Marine Aluminum Alloys," 2009 Navy SBIR Topic N09-T022, Award 90313 (2009).
I. N. A. Oguocha, O. J. Adigun, and S. Yannacopoulos, "Effect of sensitization heat treatment on properties of Al—Mg alloy AA5083-H116," J. Matter. Sci. (2008) 43:4208-4214.
Electrawatch, Inc., Degree of Sensitization (DoS) Probe; http://www.electrawatch.com/DoS.html, (2016).
W. J. Golumbfskie, K. T. Tran, J. M. Noland, R. Park, D. J. Stiles, G. Grogan, and C. Wong,"Survey of Detection, Mitigation, and Repair Technologies to Address Problems Caused by Sensitization of Al—Mg Alloys on Navy Ships," Corrosion, vol. 72, No. 2, pp. 314-328, (2015).
R. Goswami and R. L Holtz, "Transmission Electron Microscopy Investigations of Grain Boundary Beta Phase Precipitation in Al 5083 Aged at 373K," Metallurgical and Materials Transactions A, 44A, pp. 1279-1289 (2013).

ASTM B928, "Standard Specification for High Magnesium Aluminum Alloy Sheet and Plate for Marine Service and Similar Environments," ASTM B928-15, ASTM International, Inc., (2015).
S. Jain, J. L.Hudson, and J. R. Scully, "Effects of constituent particles and sensitization on surface spreading of intergranular corrosion on a sensitized AA5083 alloy," Electrochimica Acta 108 (2013) 253-264.
J. Buczynski, "Electrochemical analysis if etchants used to detect sensitization in marine grade 5xxx aluminum-magnesium alloys," M.S. Thesis, University of Virginia (2012).
J. Schindelin, et al., "Fiji: an open-source platform for biological-image analysis," Nature methods, 9(7), 576-682 (2012).
C. A. Schneider, W. S. Rasband, and K. W. Eliceiri, "NIH Image to ImageJ: 25 years of image analysis," Nature methods, 9(7), 671-675 (2012).
G Landini, et al., Auto Local Threshold, http://fiji.sc/wiki/index.php/Auto_Local_Threshold#Bernsen ("Auto Local Threshold") (downloaded from http://imagej.net/Auto_Local_Threshold#Bernsen), (2015).
Fang Li, Dan Xiang, Yexian Qin, Robert B. Pond Jr., and Kyle Slusarski, "Measurements of degree of sensitization (DoS) in aluminum alloys using EMAT ultrasound," Ultrasonics 51 (2011) 561-570.

* cited by examiner

SURFACE METALLOGRAPHIC METHOD FOR CHARACTERIZING THE DEGREE OF SENSITIZATION OF ALUMINUM-MAGNESIUM ALLOYS

CROSS-REFERENCE

This Application is a Nonprovisional of and claims the benefit of priority under 35 U.S.C. § 119 based on U.S. Provisional Patent Application No. 62/202,190 filed on Aug. 7, 2015. The Provisional Application and all references cited herein are hereby incorporated by reference into the present disclosure in their entirety.

TECHNICAL FIELD

The present invention relates to aluminum-magnesium alloys, specifically to a method for characterizing the degree of sensitization of such alloys.

BACKGROUND

Heat sensitization of aluminum 5xxx aluminum-magnesium alloys is associated with the formation of a magnesium-rich (compared to the solid solution) $Mg_2Al_3$ phase on the grain boundaries when the alloy is exposed to elevated temperatures. This magnesium-rich phase, known as beta phase $Mg_2Al_3$, or often simply as "beta phase," on the grain boundaries is anodic with respect to the surrounding aluminum-magnesium solid solution, thus presence of beta phase on the grain boundaries increases the potential for intergranular corrosion, stress-corrosion cracking, and intergranular corrosion-fatigue, leading to degradation of ship structure mechanical reliability.

Conventionally, the degree of sensitization (DOS) is characterized with the ASTM G67 Nitric Acid Mass Loss Test set forth in ASTM G67-13, "Standard Test Method for Determining the Susceptibility to Intergranular Corrosion of 5XXX Series Aluminum Alloys by Mass Loss After Exposure to Nitric Acid (NAMLT Test)," (2013) available from ASTM International, Inc. In this test, a specimen of the material in question is immersed in temperature-controlled concentrated nitric acid for a period of time, and the amount of mass lost from the specimen after the test versus before the test is measured. Essentially, the test is contrived to allow the acid to severely etch the grain boundaries, and the result is that grains fall out, accounting for the mass loss. Obviously this approach is destructive and generates undesirable hazardous waste, and so cannot be used in-situ on a ship.

The total amount of beta phase present in the worst case of sensitization is very small, while the effects on corrosion of grain boundaries is very high. A number of approaches for assessing the DOS based on measures of the amount of beta phase in the bulk material have been tried or speculated about, including use of microwave cavity resonance perturbation, electrical conductivity, hardness, ultrasonic attenuation, x-ray composition analysis, and so on. See, e.g., C. Chukunonye, "Sensitization Characterization of 5083 and 5456 Aluminum Alloys using Ultrasound," Dissertation, University of Louisiana at Lafayette (2015) ("ultrasonic method"); M. Shedd, G. Bunget, F. Friedersdorf, and N. Brown, "Embedded Long Service Life Monitoring System for Aluminum Alloy Sensitization," ASNE MegaRust Conference, (2013) ("eddy current method"); and B. A. Shaw, "Fieldable Probe for Quantitative Assessment of Degree of Sensitization in Marine Aluminum Alloys," 2009 Navy SBIR Topic N09-T022, Award 90313 (2009) ("x-ray diffraction method").

Certain mechanical properties of the alloys, such as hardness, also correlate with the DOS. See I. N. A. Oguocha, 0. J. Adigun, and S. Yannacopoulos, "Effect of sensitization heat treatment on properties of Al—Mg alloy AA5083-H116," *J. Matter. Sci.* (2008) 43:4208-4214. These correlations also could form the basis of a DOS measurement approach. Hardness in particular is a very easy measurement to make. Researchers at the Naval Research Laboratory have done exploratory research on using hardness measurements for estimating DOS. The hardness, for example Rockwell Hardness or Vicker's Hardness, decreases rapidly with degree of sensitization. However this approach requires a known unsensitized reference sample of the material being tested, which is not always available.

In addition, beta phase can exist intragranularly in addition to being on the grain boundaries, though the intragranular beta phase does not affect the intergranular corrosion significantly. Thus techniques that seek to assess DOS based on measures of the amount of beta phase in the bulk tend to be either insufficiently sensitive, or yield overestimates of the effect of grain boundary beta.

An alternative to the ASTM G67 DOS test is the portable electrochemical system known as the ElectraWatch DoS Probe developed under funding from the Department of the Navy. See Electrawatch, Inc., *Degree of Sensitization (DoS) Probe*; see also W. J. Golumbfskie, K. T. Tran, J. M. Noland, R. Park, D. J. Stiles, G. Grogan, and C. Wong, "Survey of Detection, Mitigation, and Repair Technologies to Address Problems Caused by Sensitization of Al—Mg Alloys on Navy Ships," CORROSION, Vol. 72, No. 2, pp. 314-328. The ElectraWatch DoS Probe works by measuring the electrochemical currents and voltages as the beta phase undergoes a reaction when a reagent is applied to the surface. While this works well in the laboratory, it is a specialized instrument that must have access to a large flat area of surface to seal against, to contain the electrochemical reaction volume. Further, it can be temperature sensitive and requires specially trained personnel to operate.

A viable DOS characterization tool must be specific to grain boundary beta phase. Microstructure analysis studies by NRL, see R. Goswami and R. L Holtz, "Transmission Electron Microscopy Investigations of Grain Boundary Beta Phase Precipitation in Al 5083 Aged at 373K," *Metallurgical and Materials Transactions A*, 44A, pp 1279-1289 (2013), and others have shown that high values of DOS as measured by the mass loss test are directly associated with the degree of coverage of the grain boundaries by beta phase. When the beta phase is present primarily as isolated, precipitates, the G67 mass loss is very low. When the beta phase is a continuous or nearly continuous layer, the mass loss is very high. While the exact role the continuity or topology of the beta coverage plays in G67 mass loss is not entirely known, it is sufficiently clear that measuring beta coverage of the grain boundaries provides a metallographic option for estimating DOS, if calibrated against G67. Such an approach would be non-destructive to the bulk of the material, thus could be used in-situ in some circumstances, and eliminates the generation of large amounts of acid waste.

Metallographic etching can be used to dissolve beta phase in aluminum-magnesium alloys, and if the beta phase is concentrated along grain boundaries, the etching patterns are easily seen with optical metallography. Qualitative assessment of sensitization via etching and metallography has been commonly done since the sensitization phenomenon was first identified. This is suggested in ASTM B928; see also S. Jain, J. L. Hudson, and J. R. Scully, "Effects of constituent particles and sensitization on surface spreading of intergranular corrosion on a sensitized AA5083 alloy," *Electrochimica Acta* 108 (2013) 253-264. However, prior to the current invention disclosure, no quantitative metallographic technique has been developed for this purpose.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a method for assessing the "degree of sensitization," or "DOS," of ship structures formed from aluminum-magnesium marine service alloys. The method of the present invention involves the use of a very light acid etch which only slightly affects the surface and does not damage the structural integrity of the metal, and so may be described as being "non-destructive."

The method of the present invention includes the following steps/features:

(1) Selective etching of the beta phase in a sensitized aluminum-magnesium alloy to prepare the surface for microscopic examination and to dissolve small amounts of the beta phase, which creates visible contrast between the beta phase and the rest of the alloy;

(2) Metallographic recording of the etched surface, e.g., by means of optical microscopy at magnifications ranging from 10× to 100×;

(3) Image enhancement to produce high-contrast binary images of etched and unetched areas in the metallographic image of the etched sample, where the etched, i.e., dissolved, beta phase areas appear in the image as spots formed from black pixels and the unetched portions of the sample are shown by white pixels; and (4) Image analysis of the enhanced images using line segments connecting black spots in the image to delineate a grain boundary to provide statistical information about the etched versus the unetched areas, where the average grain boundary black spot density along a grain boundary delineated by the line segments represents an estimate of the percentage of that grain boundary covered by beta phase.

Step (4) is then repeated a number of times to delineate a plurality of grain boundaries shown in the image. Once a number of grain boundaries are delineated, the next step is (5) Calibration, whereby the grain boundary beta phase percentage is converted to an expression of the degree of sensitization in the sample. Grain boundary black spot densities of less than 60% do not reflect any significant degree of sensitization in the material, while for densities greater than 60% there is a nearly linear correlation between the density and the DOS such that the DOS can be easily determined once the grain boundary black spot density is found.

BRIEF DESCRIPTION OF THE DRAWINGS

FIG. 1A is the original micrograph image and FIG. 1B is the image after it has been thresholded and converted to a black-and-white-binary image.

DETAILED DESCRIPTION

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides a method for assessing the "degree of sensitization," or "DOS," of ship structures formed from aluminum-magnesium marine service alloys conforming to the standards set by ASTM International standard ASTM B928. See "Standard Specification for High Magnesium Aluminum Alloy Sheet and Plate for Marine Service and Similar Environments," *ASTM B*928-15, ASTM International, Inc., (2015). The method of the present invention involves the use of a very light acid etch which only slightly affects the surface and does not damage the structural integrity of the metal, and so may be described as being "non-destructive."

The method of the present invention includes the following steps/features:

(1) Selective Etching of Beta Phase in Sensitized Aluminum-Magnesium Alloy.

In a first step, the surface of a sensitized aluminum-magnesium material sample to be analyzed is polished and then is etched. This etching step prepares the surface for microscopic examination and dissolves small amounts of the beta phase in the material to create a visible contrast between the beta phase and the rest of the material. In most cases, the samples will be etched using ammonium persulfate, which has been shown to be a highly selective etch for beta phase in aluminum-magnesium alloy materials, see J. Buczynski, "Electrochemical analysis if etchants used to detect sensitization in marine grade 5xxx aluminum-magnesium alloys," M. S. Thesis, University of Virginia (2012), in a temperature-controlled bath. Etching times can range from 20 to 100 minutes, with the best etching time of approximately 60 minutes corresponding to the time after which no significant changes occur. In an exemplary embodiment analyzed for this disclosure, this etching step was performed using ammonium persulfate at a 0.2 M concentration adjusted to a pH of 1.2 in a temperature-controlled bath at a temperature of 35° C. for approximately 60 minutes, though other suitable etchants and etching conditions may be used as appropriate.

(2) Metallographic Recording of the Polished and Etched Surface.

Figure 1A:
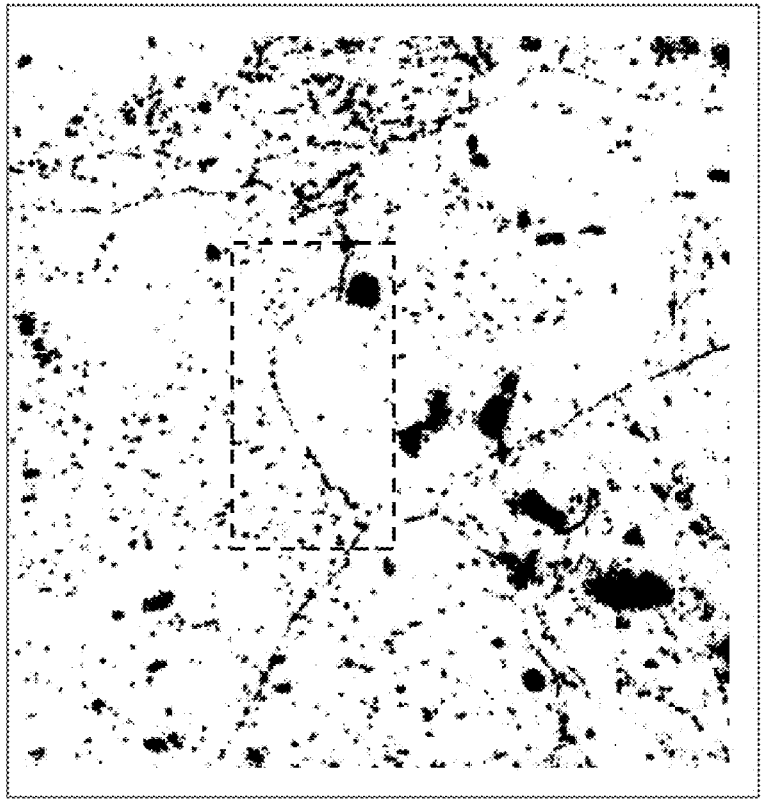
FIGS. 1A and 1B are optical metallographs depicting an aluminum-magnesium alloy sample that has been etched in accordance with the method of the present invention, where

In a next step, a metallographic recording of the polished and etched surface is made, for example, by means of optical microscopy at magnifications ranging from 10× to 100×. The best results are obtained when a large number of grain boundaries are contained in an image, to ensure good statistical confidence, but at sufficient magnification to resolve particles and separations between particles down to less than 1 micrometer in size. For the aluminum alloy samples used for our demonstration, the best results have been obtained with magnifications of 20× to 50×, recording the images in high-resolution (150 dpi) TIFF format, though any suitable graphics format or resolution can be used as appropriate. A metallograph of an exemplary etched sample is shown in FIG. 1A.

(3) Image Enhancement to Produce High-Contrast Binary Images of Etched and Unetched Areas.

The next step involves enhancement of the optical images of the etched sample to produce high-quality binary, i.e., black-and-white, images of the etched sample, where the where the etched, i.e., dissolved, beta phase areas appear in the image as spots formed from black pixels and the unetched portions of the sample are shown by white pixels. Enhancement of the image can be achieved using any suitable image manipulation software such as the Fiji or ImageJ applications known in the art. See J. Schindelin, et al., "Fiji: an open-source platform for biological-image analysis," *Nature methods,* 9(7), 676-682 (2012); and C. A. Schneider, W. S. Rasband, and K. W. Eliceiri, "NIH Image to ImageJ: 25 years of image analysis," *Nature methods,* 9(7), 671-675 (2012).

Thus, in this step, the raw images are first converted to a greyscale format, e.g., an 8-bit greyscale format, and a thresholding procedure is then applied to enhance the contrast between etched areas and unetched areas in the image, particularly along the grain boundaries. Any suitable thresholding procedure can be used to enhance the contrast, such as the ImageJ.net Auto Local Threshold procedure. See G Landini, et al., *Auto Local Threshold.* Irrespective of the method used, the ideal thresholding procedures are those for which the final beta phase coverage results are not sensitive to thresholding parameters. The most consistent results obtained by the inventors used an automatic local threshold process with a radius of 5 to 15 pixels, using the Bernsen or Otsu methods described in Auto Local Threshold, supra.

Figure 1B:
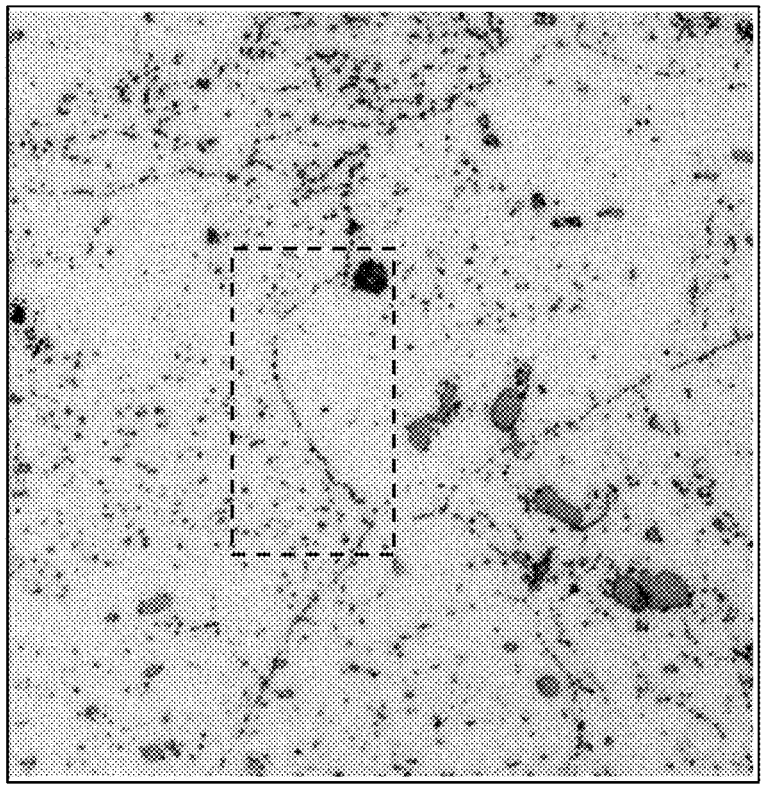

After the thresholding operation, the image is converted to pure binary format with a white background, which results in black and white images where the etched, i.e., dissolved, beta phase areas appear in the image as spots formed from black pixels and the unetched portions of the sample are shown by white pixels. FIG. 1B shows the result of this thresholding and binary conversion of the image shown in FIG. 1A, which has converted the gray-scale tones of FIG. 1A into a clear black and white image.

(4) Image Analysis of the Enhanced Images Using Line Segments Along Grain Boundaries.

In the next step, the enhanced images are analyzed to provide statistical information about the etched versus the unetched areas. In this analysis, the average "black" value along a grain boundary represents an estimate of the percentage of grain boundary covered by beta phase.

To perform this image analysis, a series of linked straight or curved line segments are used to connect the black spots in the image corresponding to the etched, i.e., dissolved, grain boundary beta phase particles. The endpoint of each line segment is located in the middle of a black spot in the image, with a length and a curvature of the line segments being configured so that they sequentially connect a plurality of black spots in the image to form a single line that represents a grain boundary. The line segments are configured so that the line goes through the middle of the black spots to be linked, and can have any appropriate linewidth, from 1 pixel up to the width of the smallest linked black spot. In some embodiments, the linewidths can all be the same for a given linked line, while in other embodiments, the linewidths can vary depending on the size of the spots to be connected, though care should be given since linewidths that are too large capture too much white space in the image while linewidths too narrow risk missing smaller dark spots. In many cases, the best linewidths can be found by trying increasing values starting from 1 pixel and determining the range of linewidths from which a resulting beta phase coverage estimate is reproducible.

Figure 2:
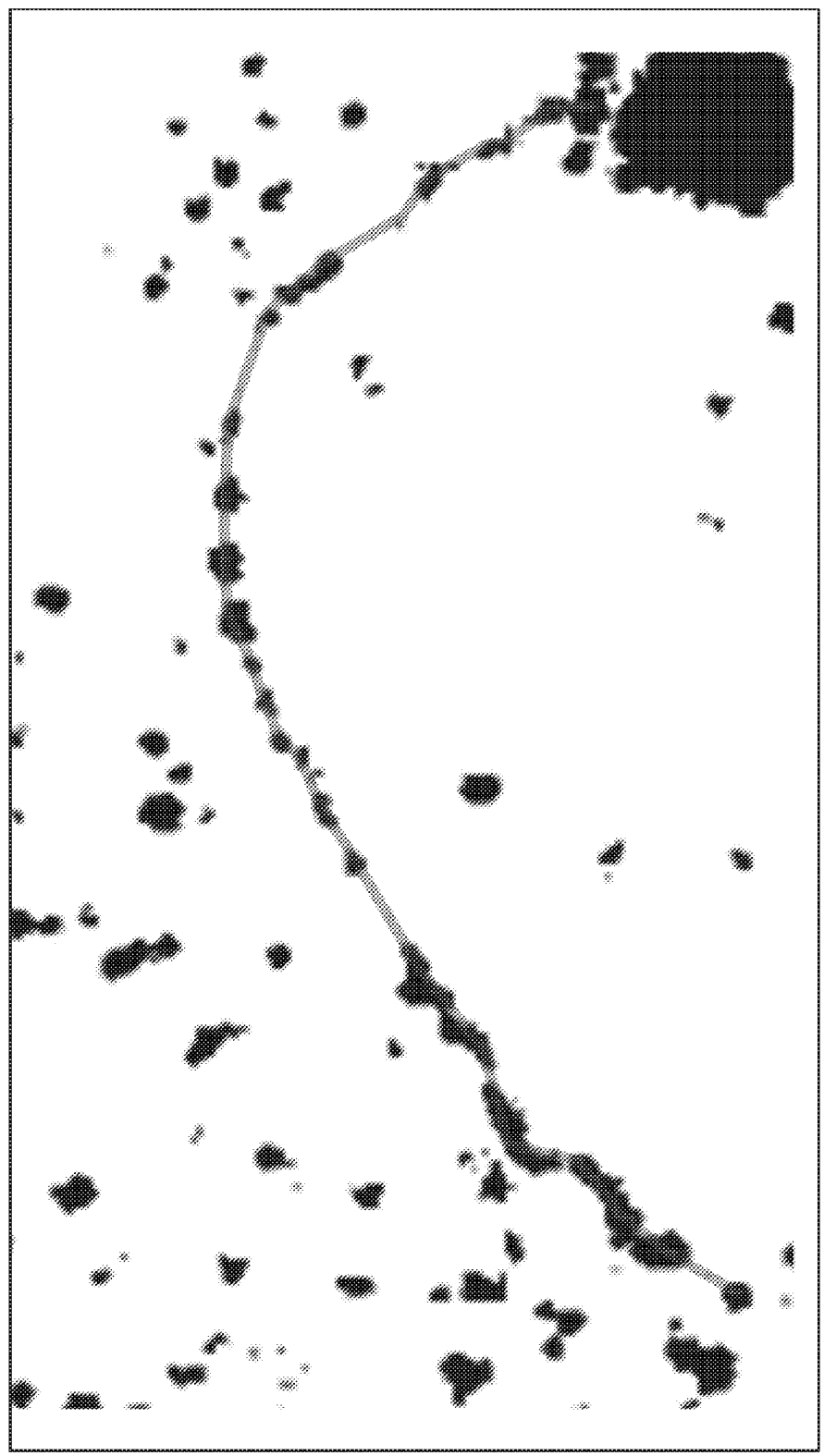
FIG. 2 is an enlargement of the boxed portion of the image in FIG. 1B in which line segments are applied to delineate a grain boundary in accordance with the method of the present invention.

FIG. 2 provides an illustrative example, and depicts an enlarged view of the boxed portion of the image in FIG. 1B in which one grain boundary is shown by a series of line segments connecting the chain of black spots delineating the grain boundary. In the exemplary case shown in FIG. 2, a series of linked line segments having a linewidth of 3 pixels were used, where the endpoint of each line segment is located in the middle of a corresponding black spot representing an etched, i.e., dissolved, grain boundary beta phase particle.

This process of using connected line segments to delineate a grain boundary is then repeated a number of times to delineate all of the grain boundaries in the image.

Figure 3:
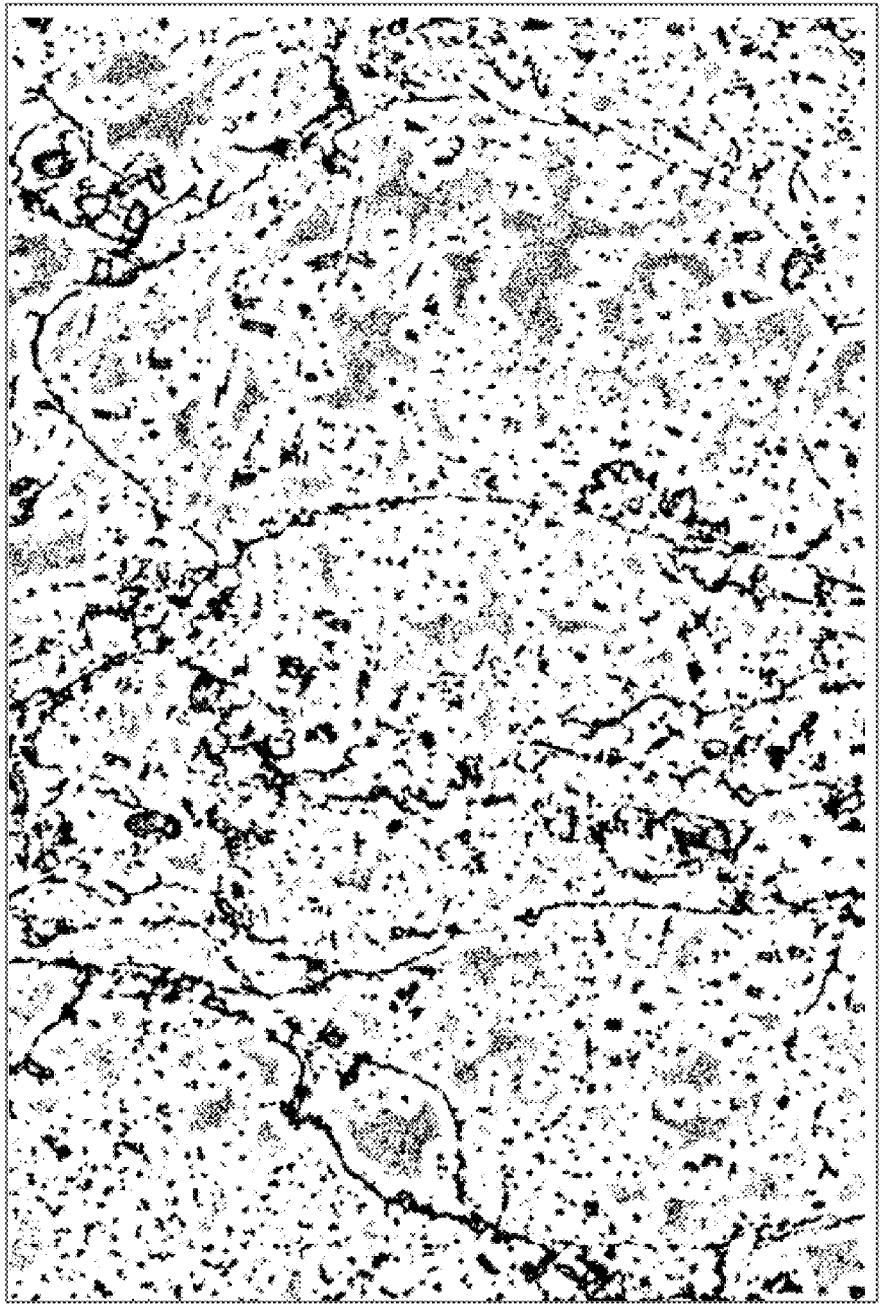
FIG. 3 is an exemplary thresholded binary optical metallograph having an average grain boundary beta phase density of about 75% as estimated using the method in accordance with the present invention.

Next, for each delineated grain boundary, the statistical distribution of black versus white pixels along the grain boundary is calculated, using any suitable graphics processing methodology such as the ImageJ application described above, and the average black pixel coverage for that grain boundary is determined, where the average black pixel coverage for a grain boundary is associated with the average beta phase present in that grain boundary. While the correspondence is not exact (the etched areas tend to be slightly bigger than the actual beta phase particles) we find a clear systematic relationship between average coverage of the black vs. the white pixels and the bulk ASTM G67 DOS values that serve as a calibration as discussed below. Thus, based on this statistical analysis, it was determined that the grain boundary delineated by the line segments shown in FIG. 2 has a black density of 48%, with the average black density for all of the grain boundaries in the image being 50%, while the sample shown in the image in FIG. 3 has a higher concentration of grain boundary beta phase particles, about 75%.

In some embodiments, the statistical distribution of black versus white pixels and average black pixel coverage can be calculated for a first grain boundary before a second grain boundary is delineated, while in other embodiments, the statistical distribution and average black pixel coverage can be calculated after all of the grain boundaries in the image are delineated. In addition, while in some embodiments, the line segments are connected to delineate multiple, separate grain boundaries, it may be possible to use the line segments connect all of the grain boundaries in the image in a single line, and in such a case, only one calculation for each of the statistical distribution and the black pixel coverage is needed, with the calculation of black pixel coverage serving as the image-wise average of total black pixel grain boundary coverage referenced below.

(5) Calibration.

The average black pixel coverage for all grain boundaries in the image is then totaled and this total is averaged over the number of delineated grain boundaries in the image to produce an image-wise average of the total black pixel grain boundary coverage in the image, where the image-wise average is associated with the grain boundary beta phase percentage present in all of the grain boundaries in the image. This image-wise average is then converted to an expression of the degree of sensitization in the sample. Measured correlation between the grain boundary beta phase percentage and the degree of sensitization measured by the standard ASTM G67 method gives the calibration for converting measured beta phase coverage to DOS values. Calibration was performed by comparing the beta phase coverage determined by the image analysis method described above on samples that had known ASTM G67 values from other measurements.

Figure 4:
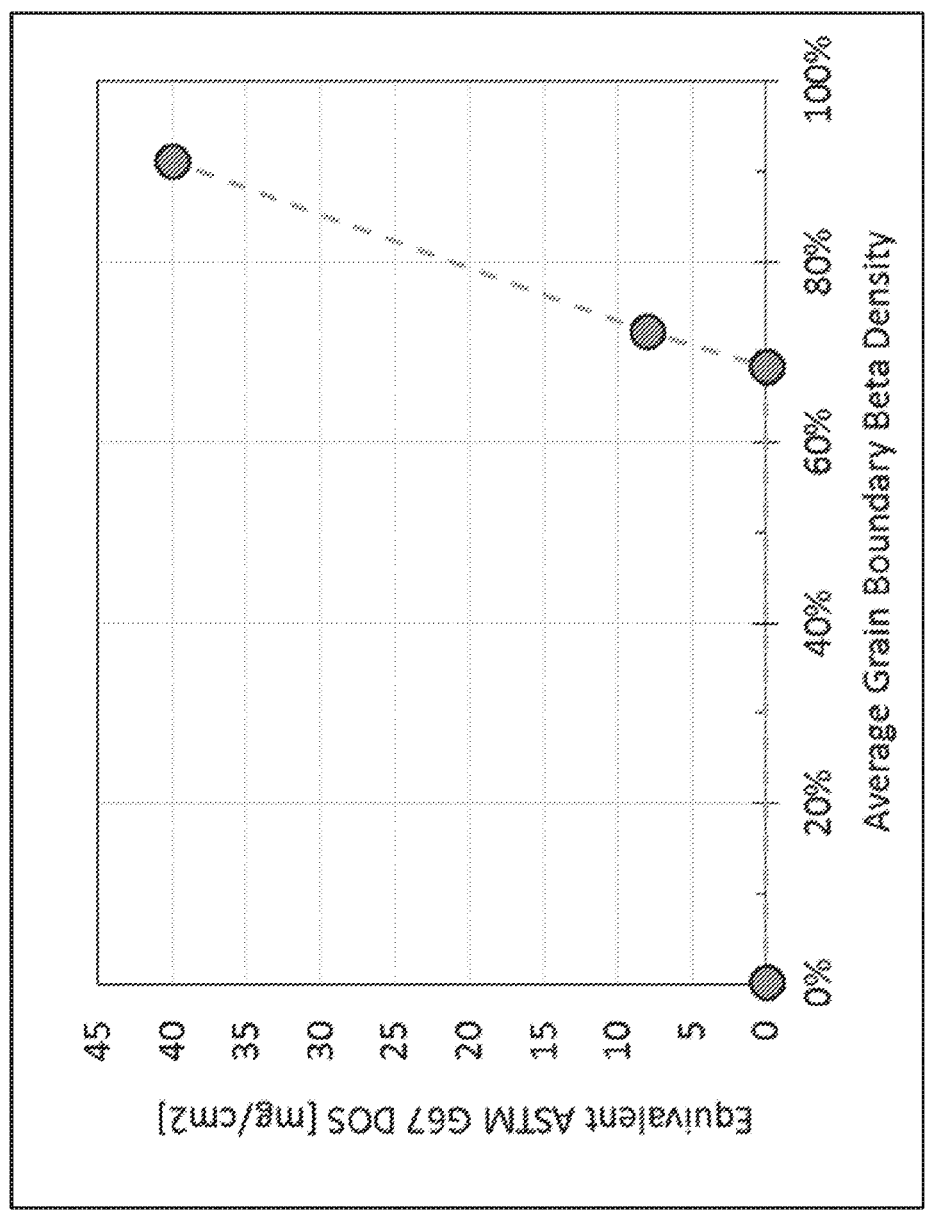
FIG. 4 is a plot showing the results of a preliminary calibration of the degree of sensitization versus average grain boundary beta phase density estimated using the method in accordance with the present invention.

An initial calibration is shown in the plot in FIG. 4. The known ASTM G67 DOS for a sample having an average grain boundary beta phase particle density of 65% is 0, while a sample having a grain boundary beta phase particle density of 75% estimated in accordance with the present invention had a measured DOS of about 10 mg/cm$^2$ and a sample having a grain boundary beta phase particle density of 90% estimated in accordance with the present invention had a measured DOS of about 40 mg/cm$^2$. Thus, as can be seen from the plot in FIG. 4, grain boundary beta phase particle densities of less than 60% do not reflect any significant degree of sensitization in the material, while for densities greater than 60% there is a nearly linear correlation between the density and the DOS such that the DOS can be easily determined once the grain boundary beta phase particle density is found.

We note that a limitation of the estimation method of the present invention occurs when the amount of grain boundary beta phase present is very low. When it is very low, it is difficult to identify with certainty what features are grain boundaries, versus other apparent but possibly random patterns of etched areas. In any case, for practical purposes, very low beta concentrations are of little interest, as the materials in such condition are effectively unsensitized anyway.

Advantages and New Features

The method of the present invention can be used to analyze the DOS of a metal sample by analyzing only the surface, and so does not require cutting/removal of material from the subject structure, and so is structurally non-destructive, in contrast to the standard ASTM G67 method of the prior art.

In addition, the method of the present invention can be applied to a single surface having any surface contour in any orientation so long as the material surface can be polished, and so can be used for both horizontal and vertical surfaces without having to treat the entire structure.

Moreover, while the standard ASTM G67 test uses 100 CC of concentrated nitric acid for every measurement, the method of the present invention uses a fairly weak acid that just wets the surface and so does not generate large quantities of hazardous waste. The etching performed in the method of the present invention does not penetrate significantly into the material and therefore does not degrade the structural properties of the material or remove mass, and the etched layer can be easily restored if needed by polishing or sanding.

Finally, the method of the present invention uses commonly available laboratory metallographic facilities and so is inexpensive and can be readily performed without the need for specialized equipment or facilities.

Alternatives

While the DOS estimation method in accordance with the present invention can employ manual, i.e., visual, selection of the grain boundaries in the enhanced images, it may also be possible to use computational algorithms can be used to automatically find and select the grain boundaries.

Any suitable image thresholding procedure and line segment criteria can be used, provided these other approaches do not artificially over- or under-estimate the grain boundary beta phase coverage.

Any suitable etchant, etching temperature, and/or etching time can be used. For example, while not as highly specific as the ammonium persulfate described herein, any known beta phase etchant can be used for aluminum-magnesium alloys.

In addition, the DOS estimation method of the present invention can be used for other metallic alloys that also exhibit sensitization phenomena, for example corrosion resistant steels, provided that suitable etchants are available.

Thus, the present invention provides a simple, inexpensive, and easily scalable method for estimating the degree of sensitization of metal alloys such as aluminum-magnesium alloys used in marine environments, and provides an alternative to the conventional methods set forth in ASTM G67-13.

Although particular embodiments, aspects, and features have been described and illustrated, it should be noted that the invention described herein is not limited to only those embodiments, aspects, and features, and it should be readily appreciated that modifications may be made by persons skilled in the art. The present application contemplates any and all combinations and modifications to those embodiments described and claimed herein, and all such combinations and embodiments are within the scope and spirit of the present disclosure.

What is claimed is:

1. A method for characterizing a degree of sensitization of an aluminum-magnesium alloy sample, comprising:
    polishing a surface of the sample;
    applying an etchant to the polished surface, the etchant selectively etching beta phase $Mg_2Al_3$ present in grain boundaries of the sample;
    making a digital metallographic image of the etched surface of the sample;
    enhancing the metallographic image to produce a binary black-and-white digital image of the etched surface, wherein areas of the image representing the etched beta phase $Mg_2Al_3$ appear in the image as black spots formed from black pixels and unetched areas of the surface appear in the image as white areas formed from white pixels;
    applying a series of linked line segments to the enhanced image to connect a plurality of black spots in the image into a single line, each of the line segments connecting two black spots in the image and having a corresponding linewidth of from 1 pixel to a width of the smallest of the plurality of black spots to be linked, wherein the single line delineates a grain boundary of the sample having etched beta phase $Mg_2Al_3$;
    applying a statistical distribution analysis to the black and white pixels along the linked line segments to determine a ratio of black pixels to white pixels along the linked line segment;
    calculating an average percentage of black pixels along the linked line segment, wherein the average percentage of black pixels along the linked line segment is indicative of the degree of sensitization of the sample;

repeating the steps of linking the line segments to delineate all of the grain boundaries present in the image, and for each of the linked line segments, repeating the steps of applying the statistical distribution analysis to each of the delineated grain boundaries and calculating the average percentage of black pixels along the lined line segment;

totaling all of the calculated average percentages of black pixels for all of the linked line segments in the image and calculating an image-wise average of a total percentage of black pixels versus white pixels on grain boundaries in the image; and converting the image-wise average of the percentage of black pixels versus white pixels on a plurality of grain boundaries to an expression of the degree of sensitization of the sample.

2. The method according to claim 1, wherein the etchant is ammonium persulfate.

3. The method according to claim 1, wherein the etchant is ammonium persulfate at a 0.2 M concentration adjusted to a pH of 1.2, the etching taking place in a temperature controlled bath at a temperature of about 35° C. for about 60 minutes.

4. The method according to claim 1, wherein the etching occurs over a time period of about 20 to about 100 minutes.

5. The method according to claim 1, wherein the etching occurs over a time period of about 60 minutes.

6. The method according to claim 1, wherein the digital metallographic image is an optical micrograph of the sample, the optical micrograph having a magnification of about 10× to about 100×.

7. The method according to claim 6, wherein the digital metallographic is an optical micrograph having a magnification of about 20× to about 50×.

8. The method according to claim 1, wherein the digital metallographic is an optical micrograph recorded in a TIFF format having a resolution of about 150 dpi.

9. The method according to claim 1, wherein the width of all of the line segments is the same.

10. The method according to claim 1, wherein the width of the line segments varies, a width of any single line segment corresponding to a width of the two black spots which the line segment connects.

\* \* \* \* \*